J. S. GOLDBERG.
DIE CASTING MACHINE.
APPLICATION FILED OCT. 8, 1915. RENEWED JULY 14, 1919.
1,322,501.
Patented Nov. 18, 1919.
8 SHEETS—SHEET 7.
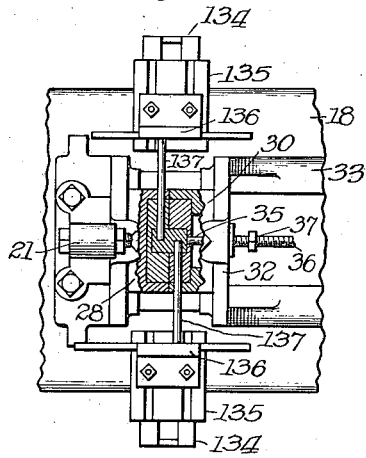
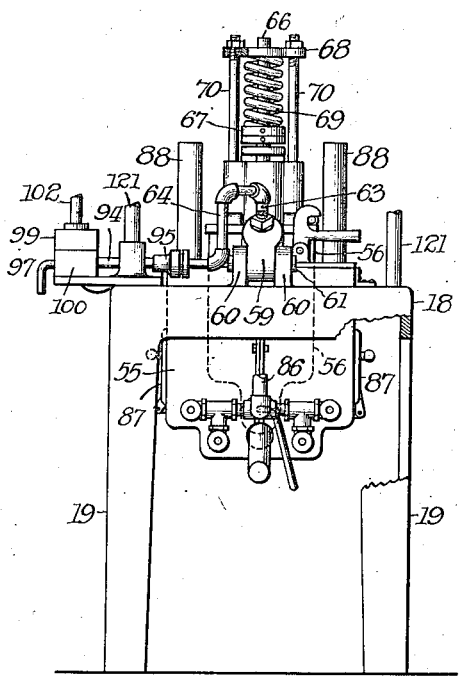
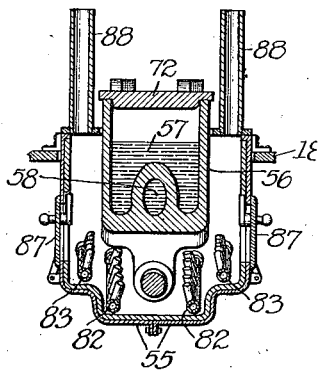
Witnesses:
Leonard W. Novander
John A. Dienner
Inventor
John S. Goldberg
By Brown, Hanson & Boettcher
Attys

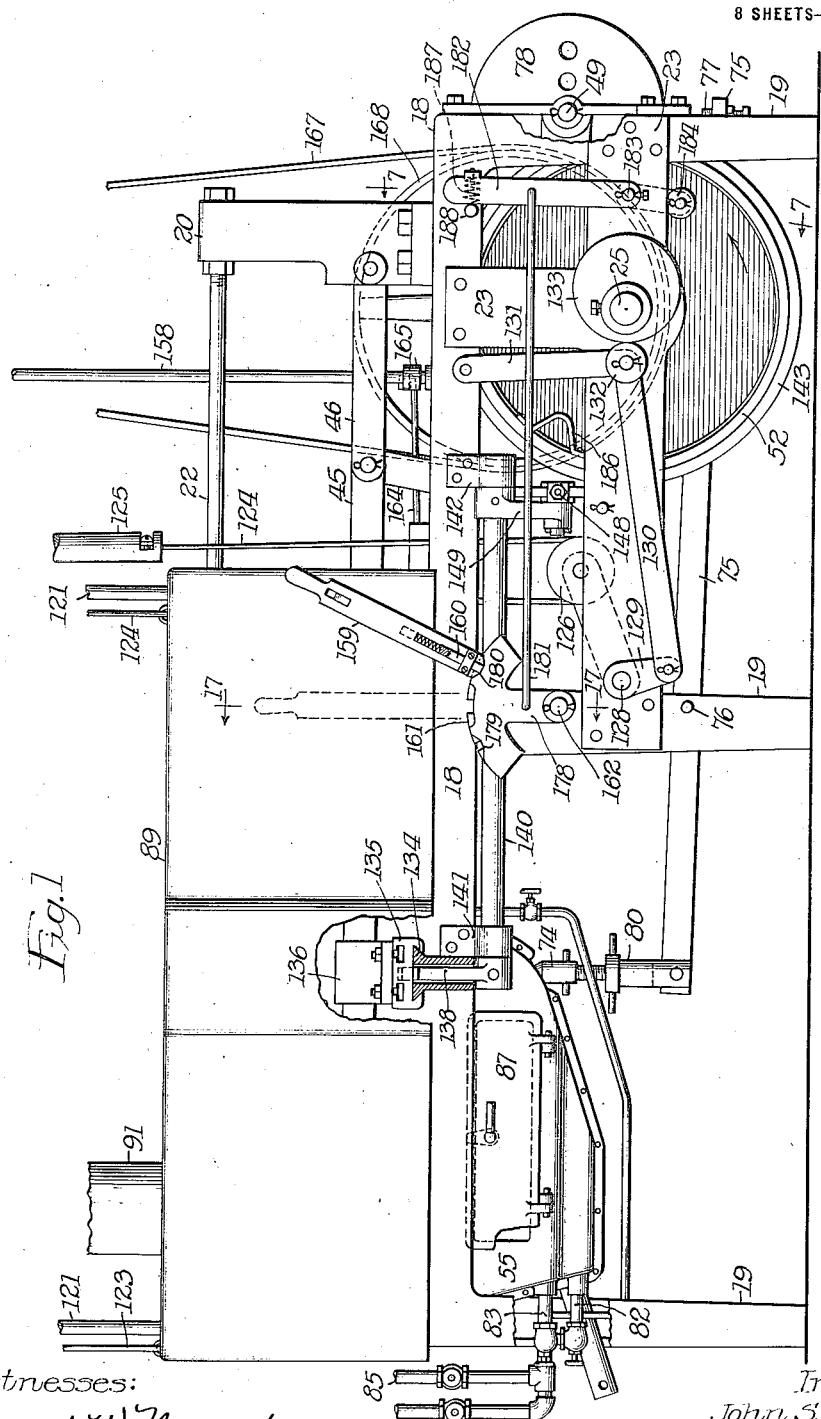

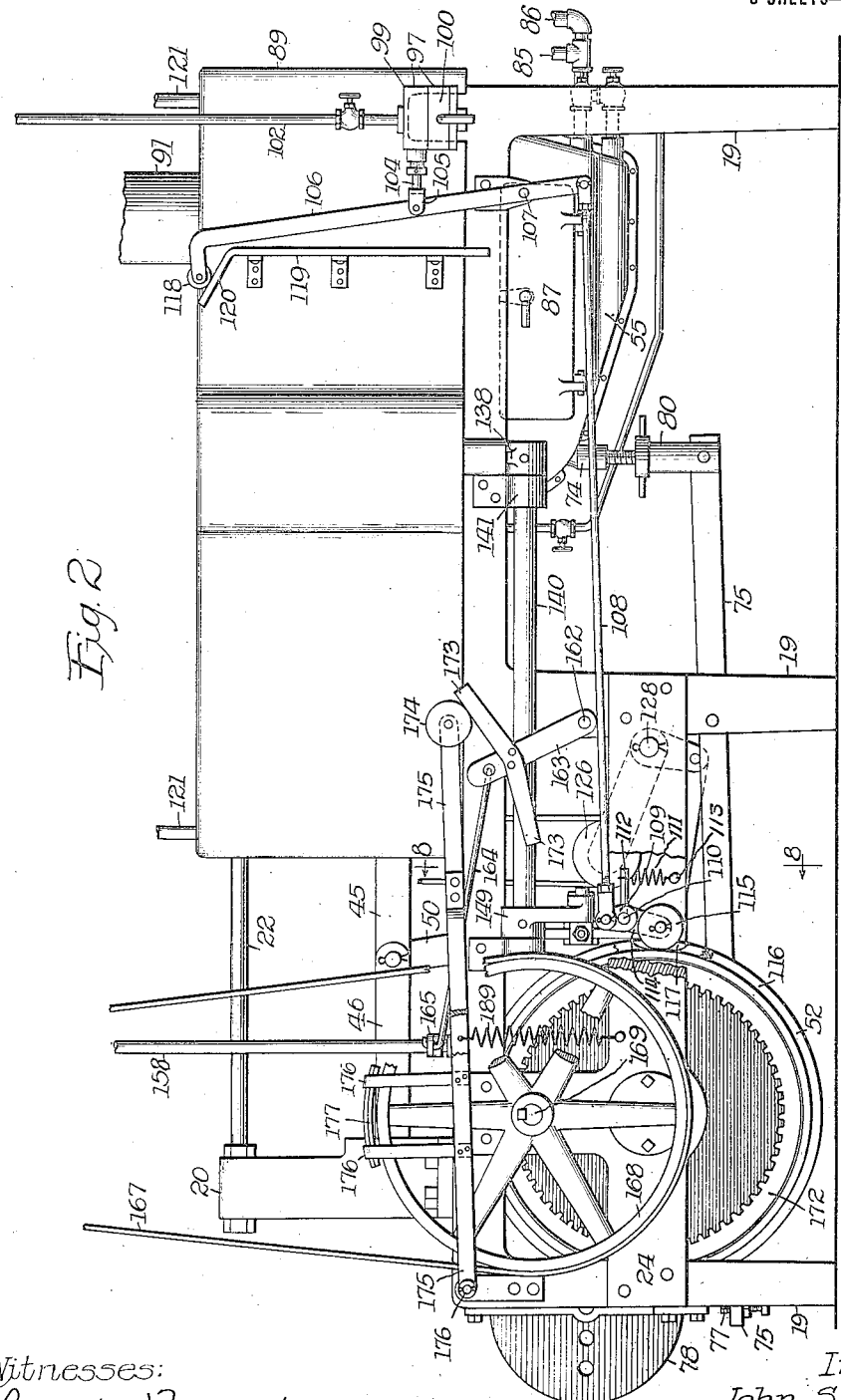

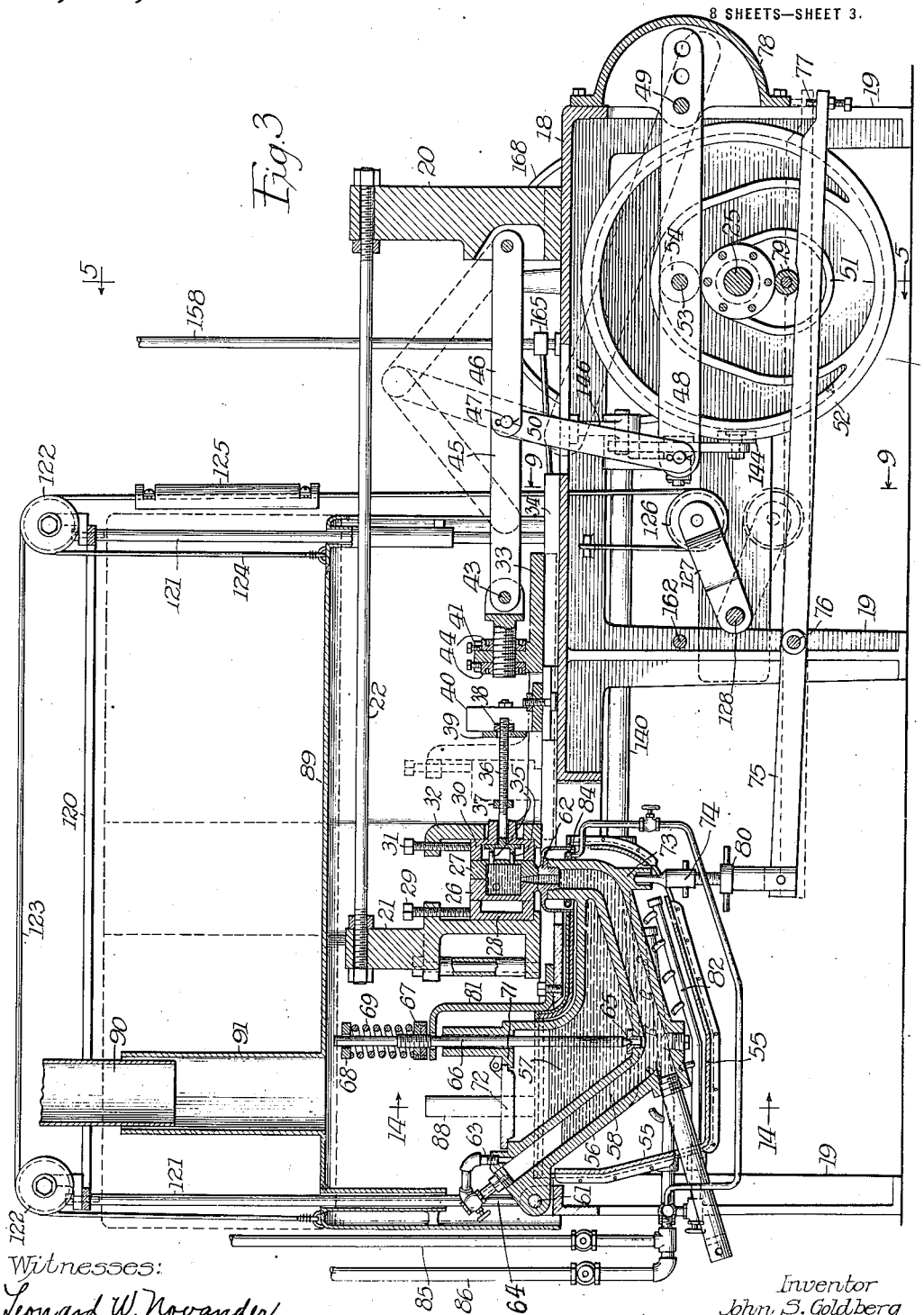

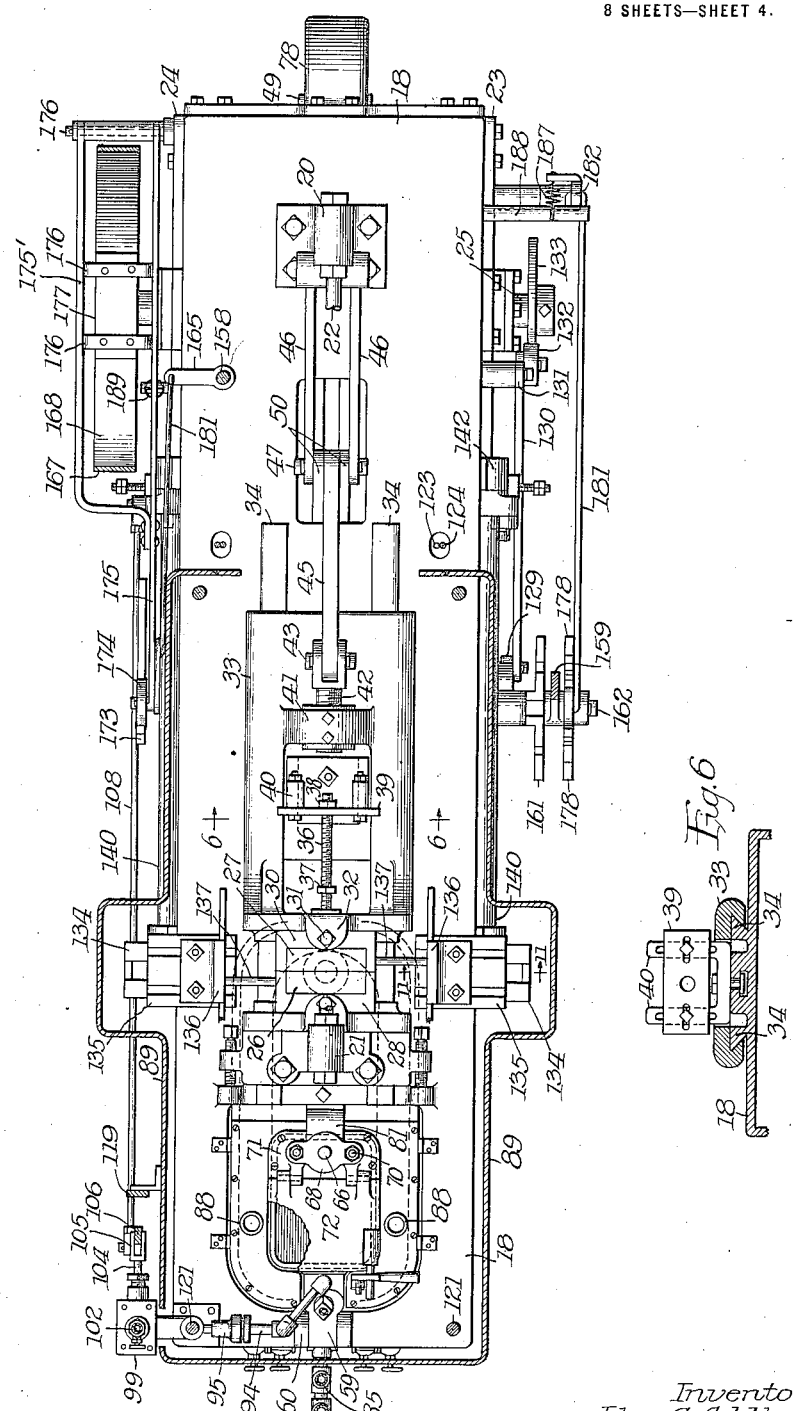

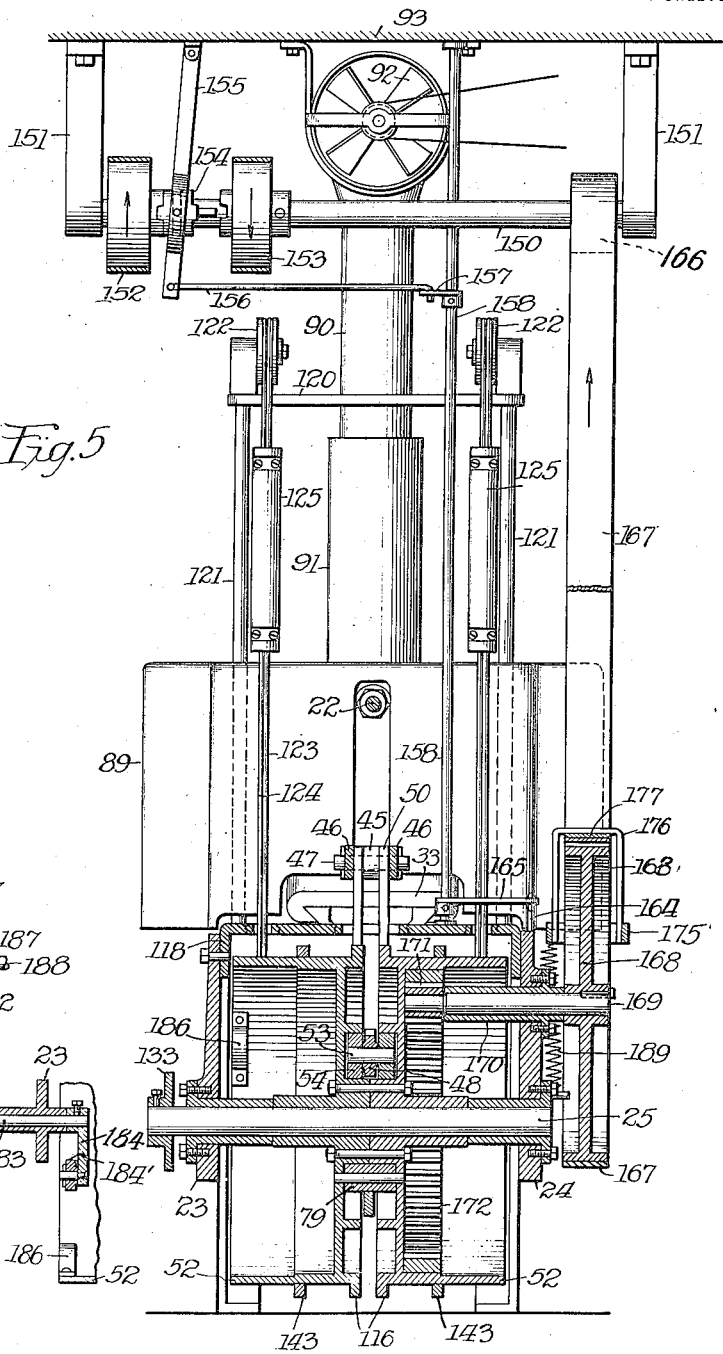

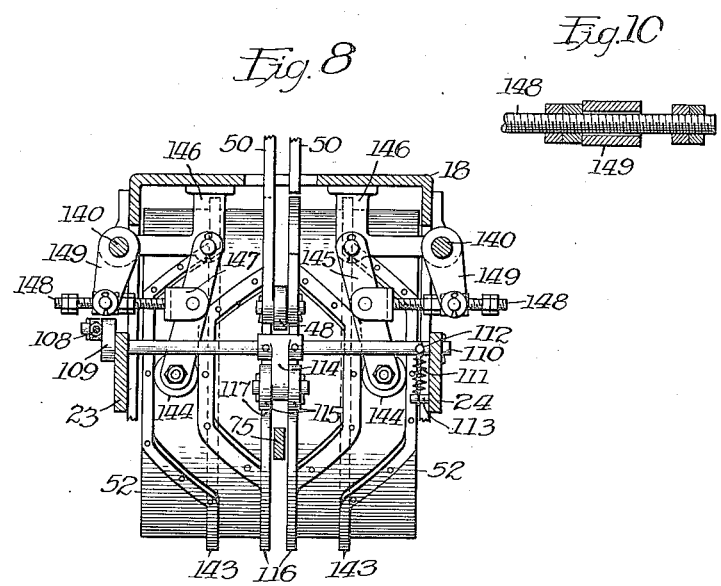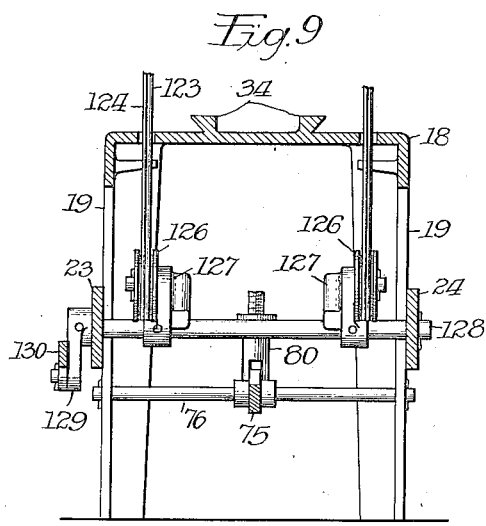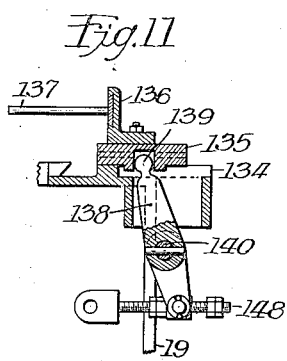

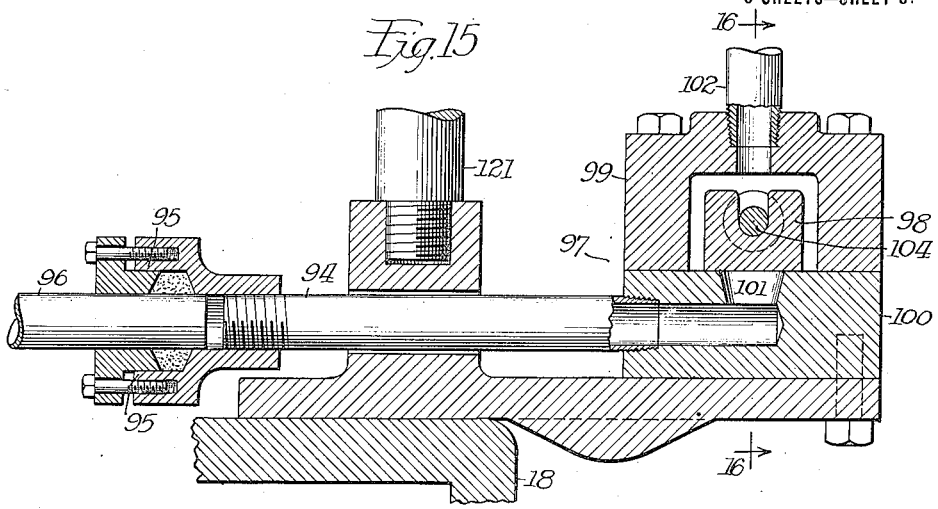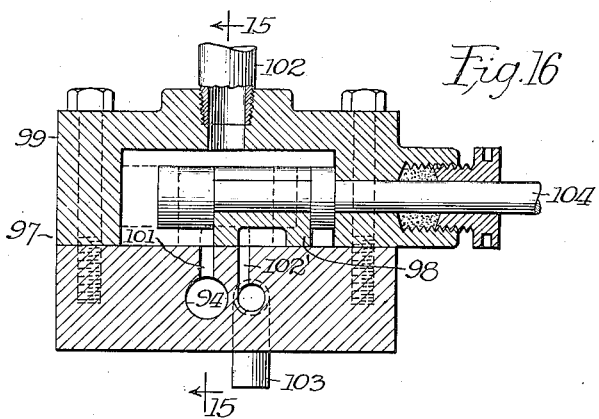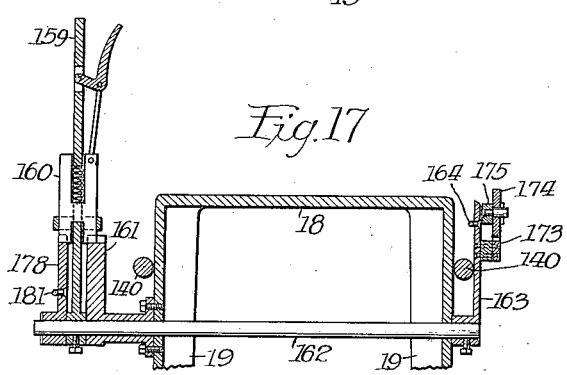

UNITED STATES PATENT OFFICE.

JOHN S. GOLDBERG, OF CHICAGO, ILLINOIS, ASSIGNOR TO ALEMITE DIE-CASTING & MFG. CO., OF CHICAGO, ILLINOIS, A CORPORATION OF ILLINOIS.

DIE-CASTING MACHINE.

1,322,501.     Specification of Letters Patent.     Patented Nov. 18, 1919.

Application filed October 8, 1915, Serial No. 54,786. Renewed July 14, 1919. Serial No. 310,877.

*To all whom it may concern:*

Be it known that I, JOHN S. GOLDBERG, a citizen of the United States, residing at Chicago, in the county of Cook and State of Illinois, have invented a certain new and useful Improvement in Die-Casting Machines, of which the following is a full, clear, concise, and exact description, reference being had to the accompanying drawings, forming a part of this specification.

The present invention is embodied in a die-casting machine.

The object of the invention is to provide an improved die-casting machine and to provide improved control-mechanism therefor.

In forming die castings it is highly desirable that the work be carried on with as great speed as is consistent with the production of good castings. In order to realize this, the machine must be operated constantly at the maximum permissible speed which will allow each operation to be properly performed in its regular order.

I have found in operating the various machines of the prior art that considerable irregularity of operation and product results unless the various operations be performed largely automatically. To this end I employ power-driven cam-mechanism for performing the different operations, the cams securing an immutable routine of operation which tends toward rapid and successful production of castings.

In carrying out the above broadly-stated object I find it advantageous to provide an improved melting and pouring pot which may readily be replaced.

I also find it advantageous to provide automatic means for stopping the machine at the end of a certain step in the operation, so that the machine will guard against accidental spoiling of the casting.

The machine which I have chosen to illustrate my invention embodies a number of points of novelty which will be apparent from the following detailed description and claims.

In the drawings,

Figure 1 is a front elevation of one embodiment of my invention;

Fig. 2 is a rear elevation of the same;

Fig. 3 is a longitudinal, vertical cross-section viewed from the same side as Fig. 1;

Fig. 4 is a plan view showing a part of the shield cut away to expose the dies and the top of the metal pot;

Fig. 5 is a transverse vertical section taken on the line 5—5 of Fig. 3, viewed in the direction of the arrows;

Fig. 6 is a detail cross-sectional view taken on the line 6—6 of Fig. 4;

Fig. 7 is a detail sectional view taken on the line 7—7 of Fig. 1;

Fig. 8 is a sectional view showing the cam drums, the view being taken on the line 8—8 of Fig. 2;

Fig. 9 is a section taken on the line 9—9 of Fig. 3 showing the means for raising and lowering the shield;

Fig. 10 is a detail showing in cross-section the lost-motion connection between the cam lever and the cam shaft for operating the die mechanism;

Fig. 11 is a detail sectional view showing an operating lever attached to the cam shaft for operating part of the die mechanism;

Fig. 12 is a plan view of the die mechanism with the dies partly broken away to show the manner of inserting the cores;

Fig. 13 is an end elevation of the machine as viewed from the left of Fig. 1, part of the mechanism being broken away for the sake of clearness;

Fig. 14 is a section through the metal pot taken on the line 14—14 of Fig. 3;

Fig. 15 is a sectional detail view showing the connection between the control valve and the pouring pot;

Fig. 16 is a sectional view through the valve and valve box taken on the line 16—16 of Fig. 15;

Fig. 17 is a section through the control lever and mechanism, taken on the line 17—17 of Fig. 1.

Frame.

The main frame of the machine comprises a base-plate 18, supported upon suitable legs 19, formed in suitable structural shape to obtain maximum strength. A pair of columns 20—21 is bolted to the bed-plate 18 and connected at their upper ends by means of the tie-rod 22. Between these columns 20 and 21 the dies and the mechanism for holding the same closed are located. A pair of bearing-plates 23 and 24 is bolted to the base-plate 18 and to the legs 19 to provide suitable bearings or mountings for the main cam-shaft 25. These bearing-plates, as well as other parts of the frame, provide suitable bearings for other shafts and parts later to be described.

I shall now describe the dies and the means for handling the same.

*Dies and operating mechanism therefor.*

The dies within which the castings are to be made may be divided up into a number of parts, as is well understood by those skilled in the art. I have shown a die divided into two parts, although it is to be understood that the same may be divided into more parts, as I have provided mechanism for handling as high as four or more parts, as will be described later.

The die which I have shown in the drawings—in Figs. 3 and 12—comprises two halves, 26 and 27, which are formed so as to close tightly together with the ingate at the bottom thereof. The part 26 is held in a suitable frame 28, which is gripped by means of the bolt 29, with its back against the column 21. This part of the die or mold is thereby held stationary. The part 27 is secured in a suitable frame-member 30, similar to the member 28, and the frame-member 30 is gripped by means of a bolt 31 in a bracket 32, which is mounted upon the slide 33, bearing upon suitable guides 34, which are secured to the bed-plate 18. The member 27 of the die is apertured to receive a stripping-pin 35, which is secured to the rod 36. The rod 36 is provided with suitable stops 37 and 38, which are adjustable with respect to the bracket 39 and to each other, so that the casting may be properly stripped from the mold when the die-member 27 is withdrawn from the member 26 by movement of the slide 33 upon the guides 34 when the die is opened. The stop 39 is mounted upon suitable brackets 40, which are stationary during the operation of the machine but can be moved to a different setting in order to strip out different sizes of castings from the die mold.

The sliding member 33 which bears the movable half of the die mold is provided with a lug 41, to which is secured a stud 42 bearing the wrist-pin 43. The stud 42 is adjustable in the lug 41 by means of the threaded collars 44, which may be held by set-screws to prevent the same coming loose under the continual vibration. The slide 33 is moved by means of a pair of links 45 and 46, which form a toggle-joint at the bearing 47. The link 45 is secured at one end to the wrist-pin 43 and at its other end to the pivot 47, the link 46 being connected to the same pivot 47 and at the other end being connected to the stationary column 20 by means of a suitable bearing. The toggle-joint is made and broken by means of a tilting lever 48, which is connected at one end by means of the bearing-pin 49 to the main frame, and at the other end by means of a link 50 to the pivot 47 of the toggle. The tilting lever 48 is actuated by means of a race-way defined by the flanges 51 in the cam-drums 52. The tilting lever 48 bears a stud 53 provided with rollers 54 of a diameter sufficient to fill the race-way. It is to be noted that there are two cam-drums 52 and that the lever 48 passes between them, having a roller 54 on each side engaging the flanges 51 of each cam-drum.

It can now be seen that for each rotation of the cam-shaft 25 which bears the cam-drums 52, the toggle will be made and broken, this action serving to press the movable half of the die-mold against the stationary part and to remove the same. These operations are suitably timed, as will be described later, to allow a filling of the mold with metal before the parts of the mold are separated and the casting stripped therefrom.

I shall next proceed to describe the manner in which the mold is filled with the liquid metal.

*Metal pot and accessories.*

The metal pot which furnishes the hot metal to fill the die-mold is shown more clearly in Figs. 3, 13 and 14, the protecting casing 55 being shown also in Figs. 1 and 2. The pot 56 is movable to bring the same into pouring relation with the ingate of the die-mold. The pot 56 comprises essentially two parts, a reservoir 57, in which the bulk of the liquid is kept at a suitable temperature, and the pouring or pressure-chamber 58. The metal pot 56 is provided with a hinge consisting of the lug 59, forming a part of the pot head, the lugs 60 formed on the base-plate 18, and the pin 61 passing through these lugs and forming a wrist-pin. A hinge for the pot is provided to allow movement thereof in order to bring the same into the position in which the metal may be injected into the die-mold. The pouring-chamber 58 comprises a generally U-shaped tube or passageway of any desired cross-section ending at its outer extremity in a nozzle 62, which is preferably made of hardened metal in order to withstand the wear and duty to which it is subjected. The other limb of this U-shaped passage is connected by a nipple 63 with an air-pressure supply-pipe 64 for injecting the metal into the mold. The lowest point of the U-shaped passage 58 is connected by means of a valve 65 with the metal reservoir 57. The valve 65 is normally closed by means of a plunger 66, which has a conical or tapered end fitting into the valve 65. The plunger-rod 66 is screw-threaded at its upper end and is provided with a pair of lock-nuts 67, between which and a stationary bracket-bar 68 the spring 69 is compressed. The bracket-bar 68 is held by a pair of bolts 70 to the cover plate 71, which forms the top of the chamber 57. The cover or door 72 is hinged to the plate 71 and through the opening which is normally closed by this cover metal may be introduced into the reservoir 57. The outer end of the metal pot 56 is provided with a lug 73, which is normally in contact with a pin 74. The pin 74 is pivoted to one end of the lever 75, which lever is tilted at each revolution of the cam-drums 52, as will be described later.

The lever 75 is pivoted at the point 76 to the main frame and is provided at its outer end with an adjustable set-screw 77, which bears against the casing 78 to support the outer end of the melting pot 56, as will be apparent from the drawings. The cam-drum 52 is provided with a roller cam 79, which moves the adjacent end of the lever 75 downward and thereby forces the nozzle of the melting-pot into engagement with the die-mold when the metal is to be injected into the mold. The pin 74 is provided with screw-threads and a lock-nut for adjusting the height of the nozzle 62 so as to bring the same into proper engagement with the die.

Opening and closing of the valve 65 is controlled by raising and lowering the nozzle of the melting-pot, so that the pressure placed upon the metal in the passageway 58 will not be transmitted to the reservoir 57. When the nozzle 62 of the metal pot is dropped down out of engagement with the die, the valve 65 will be opened, inasmuch as the plunger-rod 66 cannot follow the metal pot in its downward movement, being held in a raised position by means of the bracket 81, which is secured to the base-plate 18. When the metal pot moves downward, the bracket-bar 68 moves with it, but the plunger-rod 66 cannot follow, inasmuch as the lock-nuts 67 engage the bracket 81 and compress the spring, allowing the valve 65 to remain open and the passageway 58 to be filled from the reservoir 57. When the melting-pot is moved up in the position shown in Fig. 3, the seat of the valve 65 is moved up against the pointed end of the plunger-rod 66, as shown in the drawings, so that the spring 69 will maintain the valve closed during the pouring or injecting operation.

The metal pot 56 is maintained at a sufficiently high temperature at all times to keep the metal therein at a proper temperature, so that it can readily be injected into the dies. For this purpose a number of heaters, preferably gas burners 82 and 83, are provided, see Figs. 3, 13 and 14. A separate burner 84 for maintaining the nozzle 62 at a high temperature is supported adjacent the nozzle 62. This prevents the cooling of the metal as it is dropped through the nozzle. These burners are supplied with air and gas by suitable pipes 85 and 86, and are controlled by suitable valves which are well known in the art. The metal pot and the burners are inclosed by a casing 55 having doors 87 at the sides thereof to allow inspection of the condition of the fire and of the melting-pot.

It is to be noted that the arrangement of the passage 58 and the reservoir 57 is especially advantageous in that the passage 58 is near the fire, so that the metal contained therein, which is about to be shot into the dies, will always be the hottest part and will be least affected by supplying fresh metal to the reservoir 57.

The products of combustion from the burners pass up through the casing 55 and out thereof at the flues 88, from which they are discharged into the protecting shield 89 and pass off through the flue 90, which is arranged to telescope with a co-acting part of the casing 89 surrounding the flue 90, designated on the drawings by the reference character 91.

An exhaust fan 92, is provided for the purpose of drawing the products of combustion, such as unburnt gas, fumes from the metal, etc., up through the top of the shield in order to prevent the unburnt gas from escaping around the lower edge of the shield, and to arrange a sanitary condition for the operator. The exhaust pipe from this fan is preferably led to the outside of the building through chimney or other outlets.

I shall next proceed to describe the mechanism which controls the compressed air for injecting the hot metal.

*Air-valve and control mechanism.*

At the time when the dies are properly closed and the nozzle 62 of the pot 56 is held in contact with the dies, the air pressure is applied to the chamber 58 through the air-pipe 64. Inasmuch as the metal pot moves about a pivot 61 for each casting operation, it is necessary to provide a flexible or rotatable coupling between the stationary air pipe 94 and the movable pipe 64. This is accomplished by having the pipe 94 directly in line with the pivot 61 and including in the pipe 94 a suitable coupling 95, which will allow relative rotation between the parts and the pipe 94. The pipe 94 is connected to a suitable valve box 97, which contains a slide valve 98, shown more clearly in Figs. 15 and 16. The valve box 97 comprises the valve chest 99 and the seat 100, which contain the necessary ports for the air inlet and for the exhaust. The pipe 94 is connected to the port 101, which allows a clear passage for the compressed air from the pipe 102 to the pressure-chamber 58 when the valve is in the position shown in Figs. 15 and 16. The valve seat 100 is also provided with an exhaust port 102' which is connected by a short open pipe 103 to the atmosphere.

The valve 98 is of the usual D type and is normally held upon its seat by the pressure of the air within the chest 99. The valve 98 is secured to the valve-stem 104 by means of a slot therein and collars fastened to the valve-rod. This allows the valve to compensate for wear, but maintains the valve-stem and the valve in fixed relation. The valve-stem 104 is connected by means of a yoke 105 to a lever 106, which controls the operation of the valve. The lever 106 is pivoted at 107 to a bracket secured to the base-plate 18 and is connected at its lower end by means of the rod 108 with the crank 109, which is connected to the rocking-shaft 110. The rocking-shaft 110 is mounted in the side-plates 23 and 24 and is connected by means of the spring 111 to the side-plate 24 by means of the pins 112 and 113 so as to give the rocking-shaft 110 a tendency to rotate in the direction to open the air-valve. Such movement, however, is prevented by means of the cam-arm 114, which bears at its outer end the rollers 115, which ride upon the flanges 116 of the cam-drums 52. These flanges 116 are cut away for a short distance, as shown in Fig. 2 and indicated by the reference character 117, to allow opening of the air-valve to cause injection of the liquid metal into the dies.

As will be noted from the drawings, the depressed portion 117 is of very short length in comparison with the circumference of the cam-drums 52. As a consequence only a very short time of opening of the valve is allowed.

The valve 98 is also controlled by the position of the shield 89, so as to prevent opening of the valve while the shield is in the raised position. It will be seen in Fig. 2 that the end of the lever 106 is bent to a side and is provided at its extremity with a roller 118, which bears upon the guide 119 attached to the side of the shield 89. The guide 119 has a receding portion 120 which allows the end of the lever 106 to swing to a side into the position shown in Fig. 2, when the shield surrounds the dies and the casting mechanism. This position of the lever 106 allows the rollers 115 to ride upon the flanges 116 of the cam-drums 52. The valve 98 is not opened at this time, but as soon as the depressed portion 117 of the flanges 116 is presented to the rollers 115. The lever 106 is then swung to a position which will just open the admission port 101 for the pipe 94. As soon as the roller 115 rides out of the recess 117 the air will be shut off, and as soon as the shield 89 begins to be raised the exhaust port will be opened and the air will be exhausted from the injecting-passage 58.

I shall next proceed to describe the mechanism for raising and lowering the shield 89.

*Shield.*

The frame for supporting the shield 89 consists of a rectangular open frame 120, supported on the tops of four rods or columns 121, each of which is secured to the base-plate 18. The frame 120 supports at each corner thereof a pulley 122. Over these pulleys are run wire cables 123 and 124 for supporting the shield 89. Counterbalance weights 125 are secured to the cables 123 and 124 in order to counterbalance, either in part or in whole, the weight of the shield 89. The cables 123 and 124 are looped in pairs about two pulleys 126 and are then secured as shown in Fig. 3 to the frame or bed-plate 18 of the machine. The pulleys 126 are mounted on the ends of the rocker-arms 127, secured to the rock-shaft 128. The rock-shaft 128 is connected by means of the crank-arm 129 and the rod 130 with the end of a swinging arm 131, pivoted on the frame of the machine. The end of the lever 131 bears a friction roller 132, which engages the surface of the cam 133, secured to the main cam-shaft 25 (see Fig. 1). The cam 133 causes the shield 89 to be gradually raised and then gradually lowered for each casting operation.

*Cores and means for withdrawing same.*

In many casting operations it is necessary that the castings be recessed in certain manners, and this is most readily accomplished by means of cores, which may be withdrawn at right angles to the movement of the parts of the die-mold. I have provided ways 134 at right angles to the main ways 34, upon which are mounted slides 135 adapted to support suitable base-plates or brackets 136 for mounting the core-plungers 137. Each of the slides 135 is moved by means of a lever-arm 138, having its end framed in a suitable recess 139 in the bottom of the slide 135. The lever-arm 138 is connected to a rocking-shaft 140, lying in one side of the machine and running lengthwise thereof (see Figs. 1, 2 and 3). The rocking-shaft 140 is secured in suitable bearing-brackets 141 and 142, secured to the frame of the machine. There are two shafts 140, each for operating the corresponding slide 135 on its own side of the machine. The rocking-shaft 140 is operated by means of mechanism shown in Fig. 8. The cam-drums 52 are provided in addition to the flanges 116 with flanges 143, between which and the flanges 116 a pair of race-ways is formed for the rollers 144. Each roller 144 is mounted on a swinging arm 145 supported at its upper end on a bracket 146, secured to bed-plate 18 of the machine. The lever 145 is connected by means of a yoke 147 with the rod 148, so that the movement of the roller between the flanges 116 and 143 will be transmitted through a short lever-arm 149 to the rocking-shaft 140.

For the greater part of the circumference of the cam-drums 52 the roller 144 is held in such a position that the core-plungers 137 are in their outward or withdrawn position, but during the part of the revolution when the dies are closed together and the metal is to be injected therein, the core-plungers 137 are thrust into the dies to form the proper recesses in the castings.

*Driving and control mechanism.*

The cam-drums 52 through which power is transmitted to the various parts, may be driven in any preferred manner, although I find the mechanism illustrated in the drawings to be advantageous.

The counter-shaft 150 is supported in the bracket 151, adjacent the machine, and is provided with a pair of loose pulleys 152 and 153. The pulley 152 is driven in the forward direction, and the pulley 153 in the reverse. The shaft 150 may be connected by means of the clutch 154 to either pulley so that suitable motion will be transmitted to the machine as desired. The clutch 154 is connected by the lever 155 and the rod 156 to a crank-arm 157, secured to the vertical shaft 158. A hand lever 159, provided with a latch 160, which is adapted to be pressed by springs into the notches in the quadrant 161, is connected through the shaft 162 and the lever-arm 163 on the opposite side of the machine, to the vertical shaft 158 through the medium of the connecting-rod 164 and the crank-arm 165. The counter-shaft 150 is belted by means of a pulley 166, and the belt 167, to the driving-pulley 168, secured to the shaft 169, which is mounted in a bearing 170, secured to the side-plate 24. The inner end of the shaft 169 bears a driving-pinion 171, which meshes with the internal gear 172, secured to one of the cam-drums 52. The rocker-arm 163 which is connected by means of the shaft 162 with the controlling lever 159 is provided with a pair of arms 173 forming cam surfaces, upon which rides the roller 174. The roller 174 is mounted on the end of the arm 175, which is pivoted at its end on a pin 176, secured to the main frame of the machine. A bar 175' is secured to the lever 175 to form an open frame, which embraces the upper part of the driving pulley 168. A pair of metal straps 176 passes up and over the top of the pulley 168 and these straps support a brake-shoe 177, which bears upon the top of the pulley 168 when the lever 175 is in its lowermost position.

It can now be seen that, when the controlling lever is moved forward or reversed to cause engagement of the clutch 154 to the forward or reverse pulleys 152 and 153, the end of the lever-arm 175 will be raised by means of the cam-arms 173 and the roller 174 to lift the brake-shoe 177 from the top of the driving pulley 168. As soon as the lever 159 is moved to the neutral position—that is the dotted-line position shown in Fig. 1—the roller 174 will rest between the cam-arms 173 and the brake 177 will be applied to the pulley 168, preventing skidding of the parts.

I have provided an automatic control mechanism for disconnecting the clutch 154 just after the operation of filling the dies. The automatic disconnecting mechanism may be set to operate at any desired time, but I find it very convenient to have the same stop the driving mechanism just after the metal has been shot into the dies, the exhaust valve opened and the hood partially raised. To this end I mount loosely on the shaft 162 a cam-quadrant 178, which is provided with suitable cam surfaces 179 and 180 for disengaging the latch 160 from the quadrant 161, when the lever 159 is in either the forward or the reversed position. The cam-quadrant 178 is connected by means of a rod 181 with the lever 182, secured to the rocking-shaft 183. The rocking-shaft 183 passes through the side-plate 23 and carries at its inner end a lever 184, bearing an anti-friction roller 184' at its outer end. The left-hand cam-drum 52 as viewed in Fig. 5 is provided with a projecting inclined cam surface 186, which swings the end of the lever 184 about the pivot 183 at a certain point in the rotation of the cam-drum 52.

The lever 182 is held in its normal position, as shown in Fig. 1, by means of the spring 187, connected to the pin 188, mounted on the frame of the machine (see Figs. 1 and 7). It can now be seen that at the point when the cam surface 186 engages the end of the lever 184 to cause rotation of the cam-quadrant 178, the controlling lever 159 will be moved back to the neutral position under the influence of the weight of the brake lever 175, which may be augmented by means of the spring 189.

I shall now proceed to describe the successive operations in producing a casting. Assuming that the parts are in the positions shown in Figs. 1, 2, 3, 4 and 5, it can be seen that the air-valve has just been opened and the metal injected into the mold. As the cam-drum 52 moves forward the next operation will be that of shutting off the air from the injecting-chamber 58, which is accomplished by means of the cam-roller 115 riding upon the flange 116 out of the notch 117. Thereafter the cam 133 through the rocking-shaft 128 and the pulleys 126 starts to raise the shield 89. As soon as the shield 89 begins to rise, the valve is operated to open the exhaust port to relieve the metal pot of the air pressure therein. Shortly thereafter the cams for withdrawing the core-plungers 137 are operated, leaving the dies free to be opened.

It is to be noted that the mechanism for withdrawing the core-plungers 137 is provided with adjustable means for varying to a considerable extent the amount the core-plungers are moved. This mechanism is illustrated in Figs. 8, 9 and 10 and includes the lost-motion connection between the lever 149 and the rod 148, shown more specifically in Fig. 10. At about the same time the melting-pot is lowered so as to disengage the nozzle 62 from contact with the die-molds. During these operations the shield 89 is being raised to its uppermost position. As the metal pot 56 is lowered, the valve 65 is opened to allow the passage 58 to refill for the following casting. Further rotation of the cam-drums 52 breaks the toggle between the links 45 and 46 and opens the die-molds by moving the slide 33 and the bracket 32 into the dotted line position shown in Fig. 3. At the same time the casting is stripped from the mold.

At about this point in the operation of the machine the cam-quadrant 178 is operated to allow the controlling lever 159 to be moved to the neutral position, as shown in dotted lines in Fig. 1. This disengages the clutch 154 from the pulley 152 and stops the operation of the machine, at the same time applying the brake 177 to the driving pulley 168. The operator of the machine now removes the casting and inspects the dies and the nozzle 62 to see that the parts are in proper position, and then moves the control lever 159 to the position shown in full lines in Fig. 1. This reëngages the clutch 154 with the pulley 152 and causes the cam-drums 52 to be advanced. The shield 89 is lowered to surround the dies and the casting mechanism, the parts of the die-mold are closed together by cramping the toggle 45—46, the core-plungers 137 are then moved into position, the metal pot 56 is raised until the nozzle 62 engages the ingate of the dies, the shield 89 being in its lowermost position at this time, and then the air-valve mechanism is operated to admit air to the injection-chamber 58 to cause the metal to be shot into the mold, the parts being at that time again in the positions shown in Figs. 1 to 5, inclusive. Each cycle of operations must be initiated by the operator and the machine will automatically complete the cycle and then come to rest. The machine is so organized however that the operator may so control the same as to stop at any point or to be reversed to travel backward any desired amount.

I have found in operating machines of this type—that is die-casting machines— that it is usually the metal pot which first deteriorates and must be replaced. Having this in mind, I have constructed the present machine so that the metal pot may be readily replaced with a minimum of delay and a minimum of labor in making the replacement.

It can be seen from the above that I have provided a machine which is characterized by rapidity of operation, positiveness in sequence of operation, and automatic in action.

It will also be noticed that, due to the interrelation of the air-valve and the shield, the dies cannot be filled when the shield is in the raised position. This insures the safety of the operator and prevents accidents, even in the hands of an unskilled operator.

While I have described the particular embodiments which I have chosen to illustrate my invention with considerable particularity, it is to be understood that I am not to be limited to the details described and shown except as such details and limitations may appear in the appended claims. It is obvious that numerous changes, modifications and variations will at once suggest themselves to those skilled in the art, but I consider the same to come within the spirit and scope of my invention.

What I claim as new and desire to secure by Letters Patent of the United Stattes is:

1. In combination a metal pot comprising a U-shaped passage and a reservoir lying between the limbs of said passage and being connected to said passage at substantially the lowermost point of said reservoir, and a valve between said reservoir and said passage, one of the limbs of said passage extending above the level of the metal in the pot.

2. In combination a metal pot comprising a U-shaped passage, a reservoir lying between the limbs of said passage and being connected to said passage adjacent the lowermost part thereof, a valve between the bottom of said reservoir and said passage, a nozzle at one end of said passage and fluid pressure means connected at the other end of said passage for driving the metal in said passage through said nozzle.

3. In combination a metal pot comprising a U-shaped passage, a reservoir above said passage and lying between the limbs of the same, a valve between the bottom of said reservoir and the lower part of said passage, means for admitting fluid under pressure at one end of said passage and a discharge nozzle at the other end of said passage.

4. In combination a metal pot comprising a U-shaped passage and a reservoir communicating with said passage and lying between the limbs of the same, a valve between the bottom of said reservoir and the bottom of said passage, a discharge nozzle at one end of said passage, a die mold adjacent said nozzle, means for bringing said die mold and said nozzle together and means for admitting fluid under pressure at the opposite end of said passage.

5. In combination a metal pot comprising a U-shaped passage, a reservoir above said passage, a valve between said U-shaped passage and said reservoir, said valve comprising a relatively stationary spring pressed plunger and a valve seat, means for moving said metal pot to bring said valve stem against its seat.

6. In combination a metal pot comprising a U-shaped passage and a reservoir communicating with said passage, a valve controlling said communication, said valve comprising a valve seat secured to said metal pot and a relatively stationary spring pressed valve stem, means for moving said metal pot to bring said valve stem against its seat and means for admitting fluid under pressure at one end of said U-shaped passage.

7. In combination a metal pot comprising a U-shaped passage and a reservoir communicating with said passage, said communication having a valve, said valve comprising a valve seat secured to said metal pot and a relatively stationary spring pressed plunger, a die nozzle at one end of said passage, a die mold, means for moving said metal pot to bring said die nozzle into communication with said die mold, said movement causing said valve stem to rest upon its seat.

8. In combination a metal pot comprising a U-shaped passage, a reservoir lying between the limbs of said passage and in communication therewith at the bottom of each, a valve governing said communication, a discharge nozzle at one end of said passage, an air pipe communicating with the other end of said passage, a die mold, both ends of said passage lying above the level of the metal in the reservoir, means for moving said die mold and nozzle into contact and valve means operated thereafter for admitting air under pressure to said air pipe.

9. In combination a metal pot hinged at one end, said metal pot comprising a U-shaped passage and a reservoir, valve means connecting said passage and said reservoir, a discharge nozzle at one end of said passage, a die mold adapted to be engaged by said nozzle and cam means for moving said nozzle into engagement with said die mold and for operating said valve means.

10. In combination a base plate, a metal pot hinged thereto, a die mold mounted on said base plate, said metal pot comprising a U-shaped passage having a nozzle at one end and an air pipe at the other end and a reservoir communicating with said passage and valve means for closing off said communication when said metal pot is moved about its pivot.

11. In combination a base plate, a die mold secured thereto, a metal pot hinged thereto, said pot comprising a reservoir and a U-shaped passage, having communication with said reservoir, valve means for closing off said communication, said valve means comprising a relatively stationary spring pressed valve stem, a discharge nozzle at one end of said U-shaped passage, means for admitting fluid under pressure at the other end of said passage and cam means for moving said metal pot about its hinge to bring said nozzle into engagement with the die mold and for admitting fluid under pressure to drive the metal through said nozzle.

12. In combination a frame, a cam shaft secured to said frame, means for driving said cam shaft, coöperating sides of a die mold mounted on said frame, a metal pot pivoted on said frame and movable into engagement with said die mold when the same is closed, said cam shaft having means thereon to close said die mold and having means adapted thereafter to swing said metal pot into communicating position with said die mold.

13. In combination, a frame, a cam shaft mounted in said frame, means to drive said cam shaft, a die mold comprising relatively movable parts, a cam on said shaft for closing said die mold, a movable metal pot having a nozzle adapted to be brought into communication with said die mold, cam means on said cam shaft for moving said metal pot, means for admitting fluid under pressure to said metal pot and cam means on said shaft coöperating with said last named means.

14. In combination a frame, a cam shaft secured to said frame, means for driving said cam shaft, a separable die mold on said frame, a movable metal pot having a discharge opening adapted to be brought into communication with said die mold, cam means on said shaft for closing said die mold, cam means for moving said metal pot into communication with said die mold, a hood adapted to inclose said die mold, cam means on said shaft for moving said hood, and cam means controlling the admission of fluid under pressure to said metal pot for discharging metal into said die mold.

15. In combination a frame, a cam shaft mounted in said frame, driving means for said cam shaft, a die mold having relatively movable parts mounted on said frame, a movable metal pot, cam means on said shaft for bringing said metal pot into communication with said die mold, a movable shield and cam means on said shaft controlling the movement of said shield to cause the same to inclose said die mold, when the metal pot is in engagement therewith.

16. In combination a frame, a plurality of standards secured to said frame, a shield guided by said standards, a die mold adapted to be inclosed by said shield, a cam shaft and cam means on said shaft governing the raising and lowering of said shield.

17. In combination a frame, a plurality of standards mounted on said frame, a shield guided by said standards, sheaves mounted on said standards, cables passing over said sheaves and secured to said shield, a cam shaft and cam means for raising and lowering said shield by means of said cables.

18. In combination a frame, a standard secured to said frame, a shield guided on said standard, a sheave secured to said standard, a cable passing over said sheave and secured to said shield, the other end of said cable being secured to said frame, said cable having a loop formed therein, a sheave mounted in said loop, a rocking arm secured to said second sheave and means for moving said rocking arm to raise and lower said shield.

19. In combination a frame, a die mold on said frame, said die mold comprising a relatively stationary and a relatively movable portion, ways on said frame for guiding said movable portion, a toggle for moving said portion on said ways, said toggle having one arm pivoted to said movable portion of the mold and the other arm pivoted to said frame, a rotating cam shaft and cam means on said shaft for operating said toggle.

20. In combination a frame, a die mold mounted on said frame a metal pot pivoted at one end on said frame, said metal pot having a nozzle adapted to be swung into register with the sprue opening in said die mold, a lever fulcrumed on said frame and having its bearing below said nozzle, a cam shaft secured to said frame and cam means on said shaft for engaging said lever to move said nozzle into engagement with the die mold.

21. In combination a frame, a metal pot pivoted at one end to said frame, said metal pot having a nozzle at its inner end adapted to be swung into alinement with said die mold, said metal pot comprising a U-shaped passage in communication with said nozzle, and a reservoir for supplying molten metal to said passage, cam means for raising the nozzle end of said metal pot and valve means between said reservoir and said passage, said valve means being operated by movement of said metal pot.

22. In combination a frame member, a die mold and a metal pot mounted on said frame member, a cam shaft bearing a plurality of cams, means operated by one of said cams for bringing said metal pot and said die mold together, a shield and means operated by another of said cams for lowering said shield and means operated by another of said cams for admitting fluid under pressure to said metal pot to fill said mold.

23. In combination a frame member, a die mold, a melting pot, a cam shaft on said frame member, a plurality of cams on said cam shaft, means controlled by one of said cams for bringing said metal pot and said mold together, a fluid pressure connection for said metal pot, a valve controlled by other of said cams, and automatic means for stopping said cam shaft at a predetermined stage of its revolution.

24. In combination, a frame, a cam shaft secured to said frame, a plurality of cams on said shaft, die molds on said frame, a metal pot mounted on said frame and adapted to be brought into communication with said die molds, means controlled by one of said cams to bring said molds and said metal pot into communication, valve means for admitting fluid under pressure to said metal pot, said valve means being controlled by one of said cams, driving means, manual means for connecting said driving means and said cam shaft, and automatic means controlled by one of said cams for disconnecting said driving means and said cam shaft.

25. In combination a metal pot, valve means for admitting air under pressure to said metal pot, a pivoted lever for operating said valve, a shield for inclosing said metal pot, a cam shaft having a cam for moving said metal pot, a cam on said shaft for operating one end of said lever and means on said shield for engaging the other end of said lever.

26. In combination a cam shaft, a plurality of cams on said shaft, a driving shaft, a clutch for operatively connecting said driving shaft and said cam shaft, manual means for engaging said clutch and automatic means operated by one of said cams for disengaging said clutch.

27. In combination a pivoted metal pot, a discharge nozzle therefor, an air pipe having communication with said pot, a portion of said pipe lying axially in alinement with the pivot of said pot, and a rotary joint in said air pipe.

28. A metal pot comprising a reservoir having a valve port in the bottom thereof, a U-shaped passage lying outside of said reservoir and communicating with said valve port at the lowermost portion of said passage, both limbs of said passage normally extending above the level of the metal in said pot.

29. In combination, a metal pot comprising a U-shaped passage and a reservoir lying between the limbs of said passage, a valve having a passage connecting the bottom of said reservoir with the bottom of the U-shaped passage, a nozzle for the front end of said passage, a pivotal support for said metal pot adjacent the other end of said passage and means for swinging said entire metal pot about said pivotal support.

30. In combination, a metal pot comprising a U-shaped passage and a reservoir lying between the limbs of said passage, a valve having a passage connecting the bottom of said reservoir with the bottom of the U-shaped passage, a nozzle for the front end of said passage, a pivotal support for said metal pot adjacent the other end of said passage, means for swinging said entire pot about said pivotal support and means for operating said valve when said pot is swung about said support.

31. In combination, a metal pot having a reservoir and a U-shaped passage lying outside of and below said reservoir, a valve between the bottom of the reservoir and the passage, a discharge nozzle at one end of said passage, a pivotal support for said pot, a die mold, means for swinging said pot about its pivot to bring the top of the nozzle against the lower surface of the die mold, and means for admitting fluid under pressure to said passage, said valve being operated by movement of said pot about its pivot.

32. In a die casting machine a cam shaft having a plurality of cams, a die mold, a metal pot having a discharge passage, a source of fluid under pressure connected to said passage, a valve controlling said connection, a shield for inclosing said pot and said dies, means controlled by one of said cams for bringing said passage and die molds together, means controlled by another cam for lowering said shield and means controlled jointly by one of said cams and by said shield for operating said valve.

33. In combination, a metal pot, die molds, an inclosing shield, a cam shaft for bringing said pot and molds together, a compressed air supply pipe connected to said pot, a valve for said pipe and means controlled jointly by said cam-shaft and said shield for operating said valve.

34. In combination, a metal pot, a shield, a cam shaft, a valve for said metal pot and means governed by said cam shaft and said shield for operating said valve.

35. In a die casting machine, die molds, a metal pot, metal discharging means, a cam shaft having controlling means for said molds, said pot and said discharging means, manual means for starting said cam shaft and automatic means for stopping said cam shaft at the end of a cycle of operations.

36. In a die casting machine, a controlling cam shaft, a plurality of mechanisms operable in a cycle by said shaft, driving means, manual means for connecting said driving means and said shaft and automatic means for disconnecting said means and said shaft at the end of a cycle of operations.

In witness whereof, I hereunto subscribe my name this 4th day of October, 1915.

JOHN S. GOLDBERG.